United States Patent
Choi et al.

(10) Patent No.: US 8,400,928 B2
(45) Date of Patent: Mar. 19, 2013

(54) METHOD OF REPORTING CHANNEL STATE (75) Inventors: Jin Soo Choi, Seoul (KR); Jin Young Chun, Seoul (KR); Ae Ran Youn, Seoul (KR); Jae Hoon Chung, Seoul (KR); Eunjong Lee, Seoul (KR); Han Gyu Cho, Seoul (KR); Jong Young Han, Seoul (KR); Wookbong Lee, Seoul (KR); Hyung Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 12/531,303

(22) PCT Filed: Sep. 4, 2008

(86) PCT No.: PCT/KR2008/005231
§ 371 (c)(1),
(2), (4) Date: Sep. 14, 2009

(87) PCT Pub. No.: WO2009/031840
PCT Pub. Date: Mar. 12, 2009

(65) Prior Publication Data
US 2010/0159921 A1    Jun. 24, 2010

(30) Foreign Application Priority Data

Sep. 4, 2007 (KR) .......................... 10-2007-0089283
Nov. 5, 2007 (KR) .......................... 10-2007-0111930

(51) Int. Cl.
*H04J 1/16* (2006.01)
*H04B 7/185* (2006.01)
(52) U.S. Cl. ........................................ 370/241; 370/318
(58) Field of Classification Search .................. 370/241
See application file for complete search history.

(56) References Cited

U.S. PATENT DOCUMENTS

| 8,041,308 B2 * | 10/2011 | Yun et al. ........................ 455/69 |
| 2005/0201295 A1 * | 9/2005 | Kim et al. ..................... 370/241 |
| 2006/0094436 A1 | 5/2006 | Kim et al. |
| 2009/0060010 A1 * | 3/2009 | Maheshwari et al. ........ 375/211 |
| 2010/0034093 A1 * | 2/2010 | Roh .............................. 370/241 |

FOREIGN PATENT DOCUMENTS

EP    1786129 A1    5/2007

* cited by examiner

*Primary Examiner* — Brandon Renner
*Assistant Examiner* — Shaq Taha
(74) *Attorney, Agent, or Firm* — Lee, Hong, Degerman, Kang & Waimey (57) ABSTRACT

A method of reporting a channel state for a plurality of bands includes transmitting channel quality indicators (CQIs) for the respective bands, and transmitting CQI variation information, wherein the CQI variation information comprises CQI up/down information indicating whether the CQIs of the respective bands collectively increase or decrease and a CQI variation indicating a collective variation of the CQIs of the respective bands. Accordingly, waste of resources consumed for the CQIs can be reduced.

6 Claims, 7 Drawing Sheets

METHOD OF REPORTING CHANNEL STATE

CROSS-REFERENCE TO RELATED APPLICATIONS

This application is the National Stage filing under 35 U.S.C. 371 of International Application No. PCT/KR2008/005231, filed on Sep. 4, 2008, which claims the benefit of earlier filing date and right of priority to Korean Application Nos. 10-2007-0089283, filed on Sep. 4, 2007, and 10-2007-0111930, filed on Nov. 5, 2007.

TECHNICAL FIELD

The present invention relates to wireless communications, and more particularly, to a method of reporting a channel state.

BACKGROUND ART

Next generation mobile communication systems have been standardized aiming at providing integrated services and effective interoperations between a wired communication network and a wireless communication network, beyond a simple wireless communication service provided in the conventional mobile communication systems. To process a variety of information such as video and radio data as well as providing voice-oriented services, there is a need for a system for high-speed, large-volume communications.

In a system providing a high-speed mobility, information regarding a radio channel state of a mobile station is very important since the information is necessary to determine an adaptive modulation and coding (AMC) level for the mobile station. In addition, since there is a possibility of waste of resources allocated to the mobile station when the channel state information has an error, it is also important to provide reliable channel state information.

Hereinafter, a downlink denotes a communication link from a base station (BS) to a user equipment (UE) and an uplink denotes a communication link from the UE to the BS. In general, the BS allocates a radio resource to the UE. In the uplink, the radio resource is an uplink resource. In the downlink, the radio resource is a downlink resource. The radio resource allocated to the UE may be allocated in a distributed manner over a frequency domain or a time domain.

When data is transmitted using a radio resource distributed over the frequency domain, it is called frequency diversity. A data reception rate can be increased by distributing fading of a specific frequency band according to the frequency diversity. When data is transmitted using a radio resource distributed over the time domain, it is called time diversity. In the time diversity, the same data is transmitted several times with a specific time interval and thus a fading effect can be reduced over time, thereby improving the data reception rate.

In general, to provide communication services, one BS allocates radio resources to a plurality of UEs. In this case, each UE can have a different channel gain. Each UE may have a different frequency band with good quality. The BS can increase a data rate by effectively scheduling UEs having different channel gains. This is called multi-user diversity. A band AMC scheme is one of methods for obtaining a multi-user diversity gain. In the band AMC scheme, an assigned frequency band is divided into a plurality of bands, and in each band, a UE having a maximum channel gain is allocated with a corresponding band.

In a wireless communication system using the band AMC scheme, the UE has to transmit a channel quality indicator (CQI) to the BS. The CQI may be any one of a carrier to interference and noise ratio (CINR), a data rate indicator, and a received signal strength indicator.

A channel state is not constant but may change over time. Thus, the UE has to transmit to the BS continuously (periodically or non-periodically) the CQI for at least one band allocated to the UE itself. If CQIs of all bands are transmitted with limited radio resources, CQI feedback causes deterioration in system transmission performance.

Accordingly, there is a need for a method of transmitting more accurate channel information while reducing radio resources used for CQI feedback.

DISCLOSURE OF INVENTION

Technical Problem

The present invention provides a method of reporting a channel state.

Technical Solution

In an aspect, a method of reporting a channel state for a plurality of bands includes transmitting channel quality indicators (CQIs) for the respective bands, and transmitting CQI variation information, wherein the CQI variation information comprises CQI up/down information indicating whether the CQIs of the respective bands collectively increase or decrease and a CQI variation indicating a collective variation of the CQIs of the respective bands.

In another aspect, a method of receiving a channel state for a plurality of bands includes receiving CQIs for the respective bands, receiving CQI variation information indicating a change from a reference CQI obtained by the CQIs of the respective CQIs to a new CQI, and collectively updating the CQIs of the respective bands by using the CQI variation information, wherein the new CQI is a new reference CQI measured at a time when a predetermined time elapses after the reference CQI is measured, and the CQI variation information comprises CQI up/down information indicating whether the new CQI increases or decreases in comparison with the reference CQI and a CQI variation indicating a difference between the new CQI and the reference CQI.

In another aspect, a method of reporting a channel state in a band AMC mode includes transmitting a CINR at a first transmission period, and transmitting at a second transmission period a differential of CINR for indicating an increment or decrement of the CINR transmitted at the first transmission period and a validity indication for indicating a validity of the differential of CINR.

Advantageous Effects

According to the present invention, waste of resources consumed for a channel quality indicator (CQI) can be reduced. In addition, since a CQI variation can be specifically known, more accurate modulation/coding scheduling can be achieved.

Since a channel state can be adaptively reported in a case where there is no change in a channel or where the channel change is significantly small, it is possible to avoid transmission performance deterioration which may occur when the channel state is incorrectly reported.

MODE FOR THE INVENTION

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1:
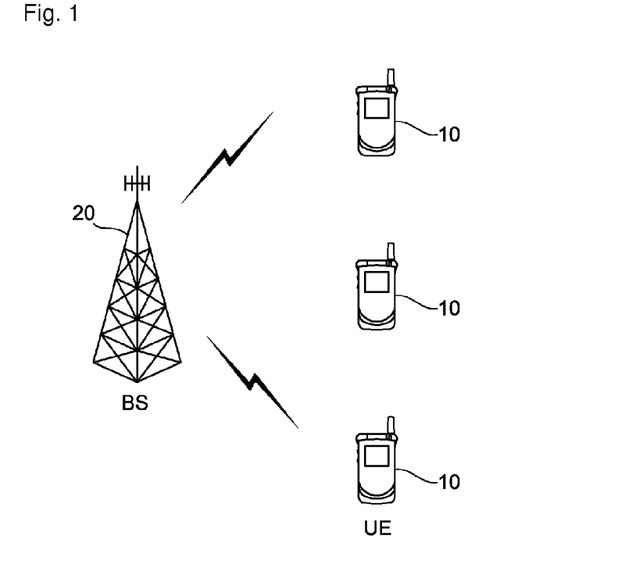
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The BS 20 is generally a fixed station that communicates with the UE 10 and may be referred to as another terminology, such as a node-B, a base transceiver system (BTS), an access point, etc. There are one or more cells within the coverage of the BS 20. The UE 10 may be fixed or mobile, and may be referred to as another terminology, such as a mobile station (MS), a user terminal (UT), a subscriber station (SS), a wireless device, etc.

A downlink represents a communication link from the BS 20 to the UE 10, and an uplink represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system. For clarity, the OFDMA-based wireless communication system will be described hereinafter.

The OFDM scheme uses a plurality of orthogonal subcarriers. Further, the OFDM scheme uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and spectral efficiency can be improved through selective scheduling in a frequency domain by utilizing channel characteristics which are different from one subcarrier to another. An OFDMA scheme is an OFDM-based multiple access scheme. According to the OFDMA scheme, a radio resource can be more efficiently used by allocating different subcarriers to multiple users.

The present invention can be applied to uplink transmission or downlink transmission. Hereinafter, an uplink frame denotes a frame of uplink transmission, and a downlink frame denotes a frame of downlink transmission. A frame may include an uplink frame and a downlink frame. The uplink transmission and downlink transmission may use a time division duplex (TDD) scheme in which transmission is made at different time or may use a frequency division duplex (FDD) scheme in which transmission is made using different frequencies.

Figure 2:
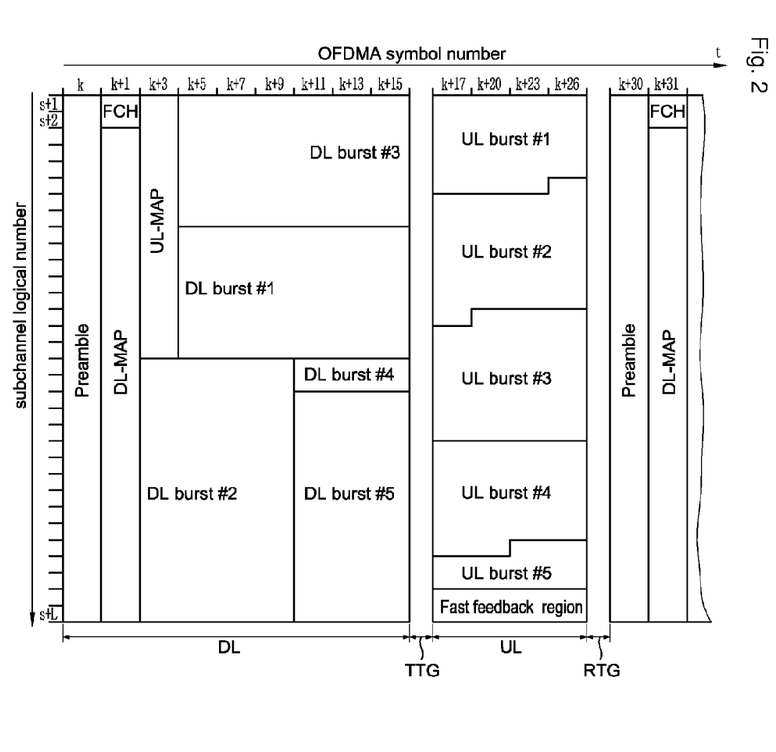
FIG. 2 shows an exemplary structure of a frame.

FIG. 2 shows an exemplary structure of a frame. The frame is a data sequence used according to a physical specification in a fixed time duration. The frame may be an OFDMA frame.

Referring to FIG. 2, the frame includes a downlink (DL) frame and an uplink (UL) frame. When a TDD scheme is used, UL and DL transmissions share the same frequency but are performed in different time periods. The DL frame is temporally prior to the UL frame. The DL frame includes a preamble, a frame control header (FCH), a DL-MAP, a UL-MAP, and a DL burst region. The UL frame includes a UL burst region.

Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, a frequency offset, and channel estimation. An FCH includes information regarding a length of a DL-MAP message and a coding scheme of the DL-MAP. The DL-MAP is a region where the DL-MAP message is transmitted. The DL-MAP message defines a connection of a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region where a UL-MAP message is transmitted. The UL-MAP message defines a connection of a UL channel. The UL-MAP message includes a configuration change count of an uplink channel descriptor (UCD) and also includes an effective start time of UL assignment defined by the UL-MAP. The UCD describes a UL burst profile. The UL burst profile indicates characteristics of a UL physical channel and is periodically transmitted by the BS by using a UCD message.

A slot is a minimum unit of possible data allocation, and is defined with a time and a subchannel. The subchannel may include a plurality of tiles in UL transmission. The subchannel may include six tiles. In UL transmission, one burst may include three OFDM symbols and one subchannel. In a partial usage of subchannel (PUSC) permutation, each tile may include four consecutive subcarriers on three OFDM symbols. The PUSC subcarrier may include eight data subcarriers and four pilot subcarriers.

In an optional PUSC permutation, each tile may include three consecutive subcarriers on three OFDM symbols. The optional PUSC subcarrier may include eight data subcarriers and one pilot subcarrier. Tiles included in the subchannel are distributively deployed throughout a whole band. A bin includes nine contiguous subcarriers on an OFDM symbol. A band is a group of four rows of the bin.

The UL burst region includes a diversity subchannel and an AMC subchannel. A tile is a basic unit of a diversity subchannel in a UL frame. Similarly to a DL frame, the AMC subchannel consists of consecutive six bins in the UL frame. If a CQI value is known, a modulation and coding scheme (MCS) can be determined when data is transmitted. Therefore, the BS indicates a CQICH control information element (IE) in a DL MAP and thus allocates the CQICH. The BS determines the MCS by receiving an average CQI of all channels.

A report response (REP-RSP) message contains channel state information of a band AMC subchannel. Upon receiving the REP-RSP message, the BS regards the REP-RSP message as a request for the band AMC subchannel. The REP-RSP message is a response for a report request (REP-REQ) message. According to available system resources and received channel state information, the BS determines whether the requested channel can be allocated. If the channel can be allocated, the BS allocates the band AMC subchannel. If the channel cannot be allocated, the BS allocates a diversity subchannel instead of the band AMC subchannel.

A fast feedback region is included in a portion of the UL frame. The fast feedback region is allocated for faster UL transmission in comparison with general UL data transmission. The fast feedback region can carry a channel quality indicator (CQI), an acknowledgement (ACK)/negative-acknowledgement (NACK) signal, etc. The fast feedback region can be located in any link frames, and the position and size thereof are not limited as shown in FIG. 2.

Figure 3:
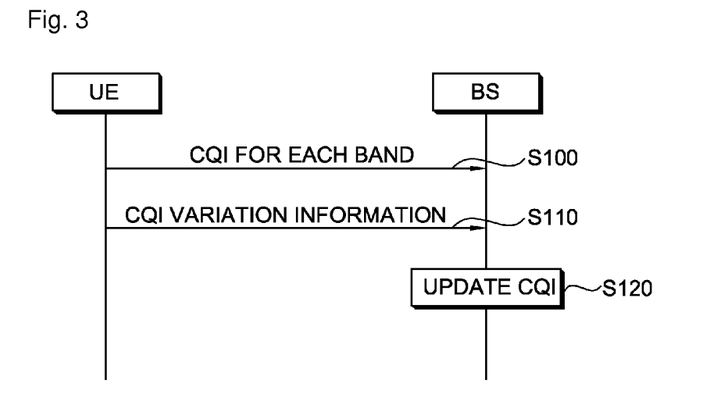
FIG. 3 is a flow diagram showing a method of reporting a channel state according to an embodiment of the present invention.

FIG. 3 is a flow diagram showing a method of reporting a channel state according to an embodiment of the present invention. As described above, a CQI to be described hereinafter may be any one of a carrier to interference and noise ratio (CINR), a modulation and coding scheme (MCS) level, a data rate indicator, and a received signal strength indicator.

Referring to FIG. 3, a UE transmits the CQI to a BS (step S100). For example, the CQI may be a CQI of a distributed mode. In the distributed mode, data is distributively transmitted over a frequency band. Data is transmitted using a non-band AMC scheme in the distributed mode. The UE can transmit the CQI periodically or non-periodically in the distributed mode. In the distributed mode, the UE or the BS can transmit data by using a subchannel including six tiles distributively deployed throughout the whole frequency band.

The CQI may be a CQI of a band AMC mode. In the band AMC scheme, subcarriers are divided into a plurality of bands, and in each band, a UE having a maximum channel gain is allocated with a corresponding band. When in the band AMC mode, the UE transmits a CQI of each band to the BS. The number of CQIs to be transmitted may be equal to the number of bands. In the band AMC mode, the UE can transmit data by using an AMC subchannel consisting of six consecutive bins in the same band.

The UE transmits CQI variation information to the BS (step S110). The CQI variation information indicates a change between a CQI previously transmitted and a CQI to be currently transmitted. For example, in a communication system in which the UE periodically transmits a CQI, the CQI variation information indicates an aspect of changes from a CQI transmitted at a first transmission period to a CQI to be transmitted at a second transmission period according to a channel state.

A CQI of each band tends to have a similar variation pattern over time. That is, in the band AMC mode, CQIs of respective bands collectively increase or decrease by a similar amount. The amount of increment or decrement is only slightly different in most of channel environments. In such a channel environment, it is ineffective to transmit a differential value indicating the amount of increment or decrement of each band under a limited radio resource.

The CQI variation information can be used to update CQIs of a plurality of assigned bands. The CQI variation information includes CQI up/down information indicating an increment or decrement of a CQI of a whole band and a CQI variation indicating an amount of increment or decrement of the CQI of the whole band. Herein, the whole band denotes a band which is included in a frequency band allocated to the UE by the BS for data communication and through which the CQI is transmitted. The CQI variation information will be described below in greater detail with reference to FIGS. 5 to 8.

The BS updates a CQI of each band by using the CQI variation information (step S120). For example, if the CQI up/down information indicates 'up' and the CQI variation is 3 dB, the BS collectively increments previously received CQI values of respective bands by 3 dB. For another example, if the CQI up/down information indicates 'down' and the CQI variation is 2 dB, the BS collectively decrements previously received CQI values for respective bands by 2 dB. In this manner, the BS can update CQIs of respective bands by using the CQI variation information.

Since there is no need to transmit CQI update information for each band, waste of resources caused by CQI feedback can be reduced.

Figure 4:
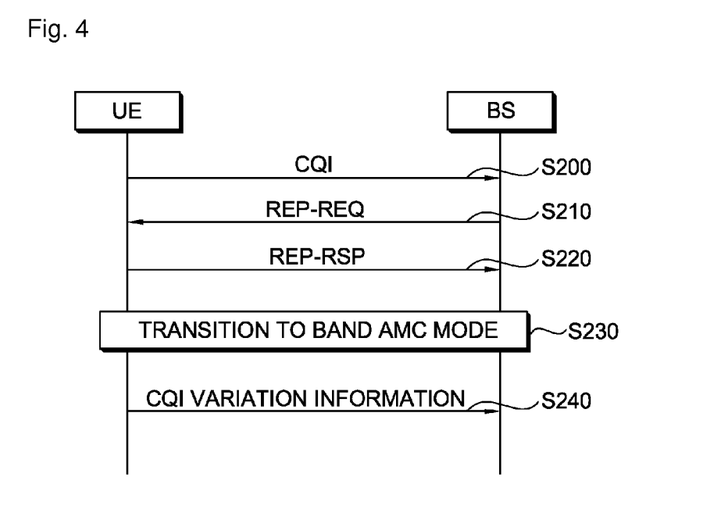
FIG. 4 is a flow diagram showing a method of reporting a channel state according to another embodiment of the present invention.

FIG. 4 is a flow diagram showing a method of reporting a channel state according to another embodiment of the present invention.

Referring to FIG. 4, a UE transmits a CQI to a BS (step S200). The CQI may be either a CQI of a distributed mode or a CQI of a band AMC mode.

The BS transmits an REP-REQ message to the UE (step S210). The REP-REQ message may be a message for requesting a transition from the distributed mode to the band AMC mode. The UE transmits an REP-RSP message to the BS (step S220). The REP-RSP message may include a CQI for a best band in response to the REP-REQ message. As the best band, a band having a relatively higher CQI value can be selected from a plurality of bands. A plurality of best bands may be selected. The REP-RSP message may include the CQI for the best band. The REP-RSP message may include a bitmap that specifies the best band selected from the plurality of bands.

The UE can transmit the REP-RSP message without having to receive the REP-REQ message of the BS. The UE may measure a CQI and transmit an REP-RSP message for requesting a transition to the band AMC mode if a condition for the transition to the band AMC mode is satisfied. The REP-RSP message may include a bitmap that specifies the best band and the CQI of the best band.

The UE and the BS are transitioned to the band AMC mode (step S230). The transition from the distributed mode to the band AMC mode may be made at the request of the UE or the BS when a specific condition is satisfied. For example, the transition from the distributed mode to the band AMC mode may be made when a maximum standard deviation of CQIs of respective bands is less than a band AMC allocation threshold and when an average CQI of the whole frequency band is greater than an average CQI for the transition to the band AMC mode.

When the transition to the band AMC mode is made, the UE transmits CQI variation information to the BS (step S240).

Now, a configuration of a payload for reporting CQI variation information and a method of reporting a channel state by using the payload configuration will be described.

Figure 5:
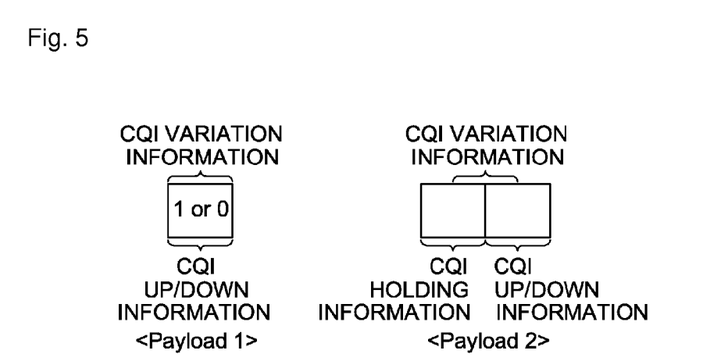
FIG. 5 shows a configuration of a payload for reporting channel quality indicator (CQI) variation information according to an embodiment of the present invention.

FIG. 5 shows a configuration of a payload for reporting CQI variation information according to an embodiment of the present invention.

Referring to FIG. 5, a payload 1 for the CQI variation information may include CQI up/down information. A reference CQI and a new CQI will be first explained before the CQI variation information is explained. A CQI of each band is updated only with the CQI variation information, and thus the new CQI and the reference CQI used as a reference of CQI variation can be defined first. The number of CQIs may be equal to the number of bands. The reference CQI is used as a reference when the CQI variation information is generated from the plurality of CQIs.

For example, the reference CQI may be an average value of the plurality of CQIs. That is, for each band, a plurality of CQIs having a slight difference are summed and the summation result is divided by the number of CQIs. The division result can be the reference CQI. For another example, the reference signal may a specific CQI selected from the plurality of CQIs by the UE or the BS. A method of selecting the reference CQI by the UE or the BS can be various according to embodiments.

The new CQI denotes a new reference CQI measured when a predetermined time elapses after the reference CQI is measured and transmitted. The predetermined time may be a first subsequent transmission period or a second subsequent transmission period in a case where the CQI is periodically transmitted.

The CQI up/down information indicates whether the new CQI increases or decreases in comparison with the reference CQI. The CQI up/down information may be represented using 1 bit. If the CQI up/down information is '1', it indicates that the new CQI increases in comparison with the reference CQI. If the CQI up/down information is '0', it indicates that the new CQI decreases in comparison with the reference CQI. Of course, the CQI up/down information of '0' may indicate an increment and the CQI up/down information of '1' may indicate a decrement.

The CQI for each band may increase or decrease by a specific value according to the CQI up/down information. In this case, the specific value by which the CQI for each band increases or decreases may be reported by the BS to the UE, or may be a predetermined fixed value. For example, if the specific value is 1 dB, the CQI for each band may increase by 1 dB when the CQI up/down information is '1' and may decrease by 1 dB when the CQI up/down information is '0'. This is for exemplary purposes only, and thus the CQI for each band may decrease by 1 dB when the CQI up/down information is '1' and may increase by 1 dB when the CQI up/down information is '0'. The specific value by which the CQI increases or decreases may be arbitrarily determined.

A payload 2 for the CQI variation information may include CQI holding information and CQI up/down information. The CQI holding information indicates whether a CQI for each band is held or changed. That is, whether the CQI for each band will be updated or not is determined according to the CQI holding information. The CQI holding information may be represented using 1 bit. For example, when a bit value of the CQI holding information is '1', it indicates that the CQI for each band is changed, and when the bit value of the CQI holding information is '0', it indicates the CQI for each band is held. The other way around is also possible, that is, when a bit value of the CQI holding information is '0', it indicates that the CQI for each band is changed, and when the bit value of the CQI holding information is '1', it indicates the CQI for each band is held.

When the CQI holding information indicates 'change', whether the CQI for each band increases or decreases is determined according to the CQI up/down information. The CQI up/down information has been described above when the payload 1 for the CQI variation information is explained. When the CQI holding information indicates 'hold', the CQI for each band is held without alteration irrespective of the CQI up/down information.

The order and the number of bits of the CQI holding information and the CQI up/down information are shown for exemplary purposes only. Thus, the number of bits of the CQI holing information and the CQI up/down information can be variously configured using one or more bits, and the order of the bits may be arbitrarily determined.

Figure 6:
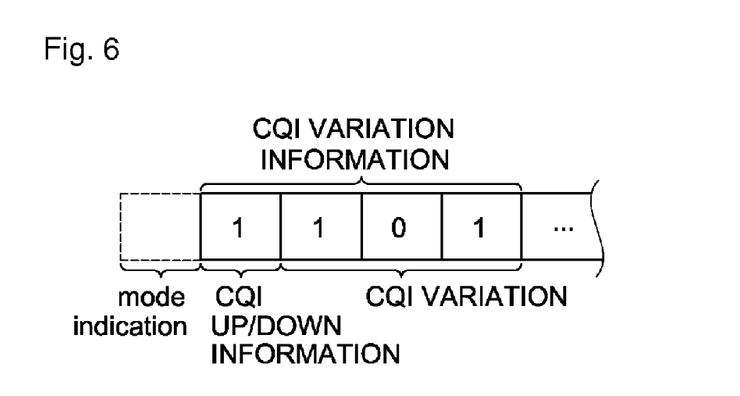
FIG. 6 shows a configuration of a payload for reporting CQI variation information according to another embodiment of the present invention.

FIG. 6 shows a configuration of a payload for reporting CQI variation information according to another embodiment of the present invention.

Referring to FIG. 6, the payload may include a mode indication and CQI variation information. The mode indication indicates whether the payload is used in a multiple input multiple output (MIMO) mode or in a CQI feedback mode. The mode indicator shown by a dotted line in FIG. 6 may be omitted.

The CQI variation information includes CQI up/down information and a CQI variation. Similarly to FIG. 5, the CQI up/down information indicates whether CQIs for all bands collectively increase or decrease. The CQI variation indicates a specific variation amount when the CQI for each band increases or decreases according to the CQI up/down information. Unlike a case where the increment or decrement amount is determined in the payload 1 of FIG. 5, the UE informs the BS of the CQI variation that is an actual difference between the reference CQI and the new CQI. The BS can more accurately update the CQI for each band by using the CQI variation.

Although the CQI variation is represented using 3 bits, this is for exemplary purposes only. When the CQI variation is represented using 3 bits, the CQI variation can be represented with values in the range of 0 to 7. That is, the CQI variation can be expressed by 8 quantized levels. Assume that a level difference is 2 dB. Then, for example, if the CQI up/down information indicates 'up', the CQI for each band increases by 2 dB when the CQI variation is '0' (i.e., bit information : 000), and the CQI of each band increases by 4 dB when the CQI variation is 1 (i.e., bit information : 001).

On the other hand, for example, if the CQI up/down information indicates 'down', the CQI of each band decreases by 6 dB when the CQI variation is 2 (i.e., bit information: 010), the CQI of each band decreases by 8 dB when the CQI variation is 3 (i.e., bit information: 011). The level difference can be set not only to 2 dB but also to other various values. In a case where the payload is configured without CQI holding information, if bit information of the CQI variation indicates '000', it may indicate that an increment (or a decrement) is '0'. That is, it can be indicated that the CQI can be held without the CQI holding information. In a case where the payload includes the CQI holding information, a range of a value for expressing the CQI variation can be further increased.

Figure 7:
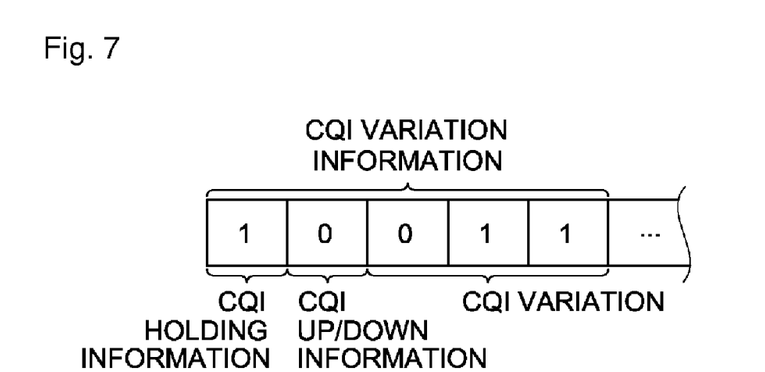
FIG. 7 shows a configuration of a payload for reporting CQI variation information according to another embodiment of the present invention.

FIG. 7 shows a configuration of a payload for reporting CQI variation information according to another embodiment of the present invention.

Referring to FIG. 7, the payload for reporting the CQI variation information includes CQI holding information, CQI up/down information, and a CQI variation. Since a bit value of the CQI holding information is '1 (i.e., change)', it can be seen that a CQI for each band changes. In addition, since the CQI up/down information indicates '0 (i.e., down)', it can be seen than CQIs of respective bands collectively decrease. In addition, since the CQI variation is '011', it can be seen that, when a level 1 corresponds to 2 dB, the CQI for each band decreases by a level 3 (i.e., 8 dB). If the bit value of the CQI holding information indicates '0 (i.e., hold)', irrespective of the CQI up/down information and the CQI variation, the BS holds the previously received CQI for each band without updating.

As such, when CQIs of all bands are collectively updated by using one group of CQI variation information, the CQI up/down information is separately reported for each band. Therefore, waste of resources can be reduced. In addition, since the CQI variation can be specifically known, modulation/coding scheduling can be more accurately implemented.

Figure 8:
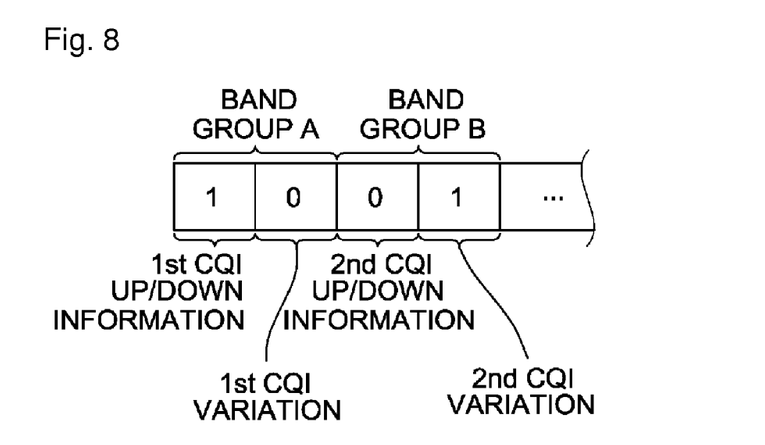
FIG. 8 shows a configuration of a payload for reporting CQI variation information according to another embodiment of the present invention.

FIG. 8 shows a configuration of a payload for reporting CQI variation information according to another embodiment of the present invention.

Referring to FIG. 8, the payload for reporting the CQI variation information includes band group information and CQI up/down information. A band group denotes a group of a plurality of bands having similar a CQI variation pattern. For example, first and second bands having similar CQI variation patterns are grouped into a band group A. CQIs of the first and second bands belonging to the band group A are updated by first CQI variation information (i.e., first CQI up/down information and a first CQI variation).

In the same manner, third and fourth bands having similar CQI variation patterns are grouped into a band group B. CQIs of the third and fourth bands belonging to the band group B are updated by second CQI variation information (i.e., second CQI up/down information and a second CQI variation). Additional signaling may be necessary so that band groups are flexibly grouped according to a channel condition. Additional group index signaling may be included in the scope of the present invention. On the other hand, when grouping is performed without allowing addition of additional bits, grouping may be sequentially performed starting from a first band of an assigned frequency band. In other words, when two groups are allowed, some selected parts of a whole band can be defined as a group 1 and the remaining bands may be defined as a group 2. A grouping method may be agreed in advance between the BS and the UE or may be reported by the BS to the UE.

Figure 9:
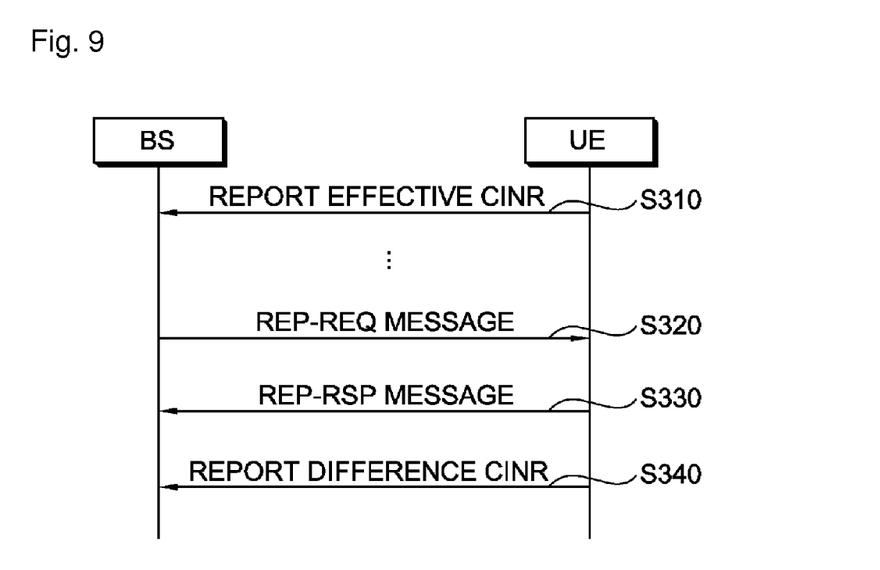
FIG. 9 is a flow diagram showing a method of transmitting channel information in a band adaptive modulation and coding (AMC) mode according to an embodiment of the present invention.

FIG. 9 is a flow diagram showing a method of transmitting channel information in a band AMC mode according to an embodiment of the present invention.

Referring to FIG. 9, a UE reports an effective carrier to interference and noise ratio (CINR) to a BS (step S310). A UE can measure the CINR from a pilot or data transmitted by a BS. The CINR can be represented with a ratio of signal power with respect to an error. The CINR can be expressed by Equation 1 below.

MathFigure 1

$$CINR[k] = \frac{A[k]}{E[k]} \quad \text{[Math. 1]}$$

Herein, A[k] denotes an average signal power, and E[k] denotes a mean-squared residual error. The average signal power can be expressed by Equation 2 below. The mean-squared residual error can be expressed by Equation 3 below.

MathFigure 2

$$A[k] = \sum_{n=0}^{N-1} |s[k,n]|^2 \quad \text{[Math. 2]}$$

MathFigure 3

$$E[k] = \sum_{n=0}^{N-1} |r[k,n] - s[k,n]|^2 \quad \text{[Math. 3]}$$

Herein, r[k,n] denotes a receive (Rx) symbol n measured at a time index k. s[k,n] denotes a pilot symbol corresponding to the Rx symbol n.

The CINR may be reported by the BS periodically so as to select a modulation and coding scheme (MCS) for a radio resource allocated to the UE. The CINR can be transmitted through a CQICH for transmitting a CQI. The CQICH may be a fast feedback channel. Alternatively, the CINR can be transmitted through an REP-RSP message. The REP-RSP message is a response for an REP-REQ message. The REP-REQ message may be transmitted by the BS to the UE. The REP-RSP message may be transmitted by the UE to the BS.

The effective CINR may be periodically transmitted in a distributed mode. In the distributed mode, data is distributively transmitted over a frequency band. Data is transmitted using a non-band AMC scheme in the distributed mode. For example, in the distributed mode, data can be transmitted using a subchannel including six tiles distributively deployed throughout the whole frequency band. In the band AMC scheme, subcarriers are divided into a plurality of bands, and in each band, a UE having a maximum channel gain is allocated with a corresponding band. The maximum channel gain can be attained by allocating the band to a UE having higher CINR value at the band. In the band AMC mode, the UE can transmit data by using an AMC subchannel consisting of six consecutive bins in the same band.

The BS transmits an REP-REQ message to the UE (step S320). The REP-REQ message may be a message for requesting a transition from the distributed mode to the band AMC mode. The transition from the distributed mode to the band AMC mode may be made at the request of the UE or the BS when a specific condition is satisfied. For example, the transition from the distributed mode to the band AMC mode may be made when a maximum standard deviation of CINRs of respective bands is less than a band AMC allocation threshold and when an average CINR of the whole frequency band is greater than an average CINR for the transition to the band AMC mode.

The UE transmits an REP-RSP message to the BS (step S330). The REP-RSP message may include a CINR for a best band in response to the REP-REQ message. As the best band, a band having a relatively higher CINR value can be selected from a plurality of bands. A plurality of best bands may be selected. The REP-RSP message may include the CINR for the best band. The REP-RSP message may include a bitmap that specifies the best band selected from the plurality of bands.

The UE can transmit the REP-RSP message without having to receive the REP-REQ message of the BS. The UE may measure a CINR and transmit an REP-RSP message for requesting a transition to the band AMC mode if a condition for the transition to the band AMC mode is satisfied. The REP-RSP message may include a bitmap that specifies the best band and the CINR of the best band.

When the transition to the band AMC mode is made, the UE reports a difference CINR to the BS (step S340). The difference CINR may be transmitted through a CQICH or a fast feedback channel periodically or in an event-driven manner. The difference CINR includes a differential of CINR indicating an increment or decrement of each best band previously reported. The differential of CINR may be represented in a bitmap format. The difference CINR can include a validity indication for indicating a validity of the differential of CINR. Whether a previously reported CINR is maintained can be known by using the validity indication.

Now, a configuration of a payload for reporting a difference CINR and a method of reporting a channel state by using the payload configuration will be described.

Figure 10:
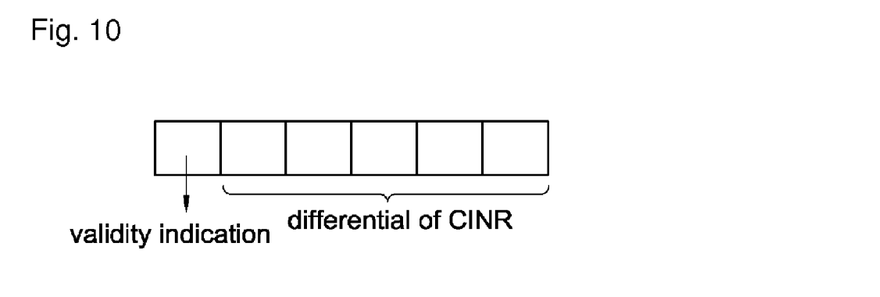
FIG. 10 shows a configuration of a payload for reporting a difference carrier to interference and noise ratio (CINR) according to an embodiment of the present invention.

FIG. 10 shows a configuration of a payload for reporting a difference CINR according to an embodiment of the present invention.

Referring to FIG. 10, the payload of the difference CINR includes a validity indication and a differential of CINR. It is assumed herein that the payload of the difference CINR consists of 6 bits, wherein the validity indication consists of 1 bit and the differential of CINR consists of 5 bits.

The differential of CINR indicates an increment or decrement of a CINR for each of best bands previously reported. Bits of the differential of CINR may respectively correspond to the best bands. That is, 5 bits of the differential CINR indicate an increment or decrement of CINRs of 5 best bands. The CINR of the best band can increase or decrease by a specific value. In this case, the specific value by which the CINR increases or decreases may be reported by the BS to the UE, or may be a predetermined fixed value. For example, if the specific value is 1 dB, when the differential of CINR is transmitted in the form of '10010' for the 5 best bands, CINRs of a $1^{st}$ best band and a 4th best band may increase by 1 dB, and CINRs of the remaining bands may decrease by 1 dB. This is for exemplary purposes only, and thus the CINR may decrease by 1 dB when a bit value for the differential of CINR is '1' and may increase by 1 dB when the bit value for the differential of CINR is '0'. The specific value by which the CINR increases or decreases may be arbitrarily determined.

The validity indication indicates a validity of the increment or increment of the CINR. The validity indication may be expressed using one bit. For example, if a bit value of the validity indication is '1', the differential of CINR may be valid, and if the bit value of the validity indicator is '0', the differential of CINR may be invalid. Alternatively, if a bit value of the validity indication is '0', the differential of CINR may be valid, and if the bit value of the validity indicator is '1', the differential of CINR may be invalid.

If the differential of CINR is valid, the CINR for each best band previously reported increases or decreases according to the differential of CINR. That is, the CINR for each best band is updated. Otherwise, if the differential of CINR is invalid, the CINR for each best band previously reported is maintained without alteration irrespective of a bit value of the differential of CINR. That is, in a situation where there is no need to update the CINR for each best band previously reported, the situation can be specified only using the validity indication.

Meanwhile, in a difference CINR, the bit of the validity indication may be transmitted in the form of NULL. That is, the difference CINR may be transmitted by assigning transmit (Tx) power to the bit of the differential of CINR and by not assigning Tx power to the bit of the validity indication. If the bit of the validity indication is transmitted in the form of NULL, the difference CINR means a previously transmitted CINR maintained without alteration. Alternatively, in the difference CINR, at least one of bits of the differential of CINR can be transmitted in the format of NULL. Also, in this case, the difference CINR means a previously transmitted CINR maintained without alteration. The difference CINR, in which any one of the validity indication and the differential of CINR is transmitted in the form of NULL, may be a maintain command indicating that the previously transmitted CINR has to be maintained without updating.

The order and the number of bits of the validity indication and the differential of CINR are shown for exemplary purposes only. Thus, the number of bits of the validity indication and the differential of CINR can be variously configured using one or more bits, and the order of the bits may be arbitrarily determined.

Figure 11:
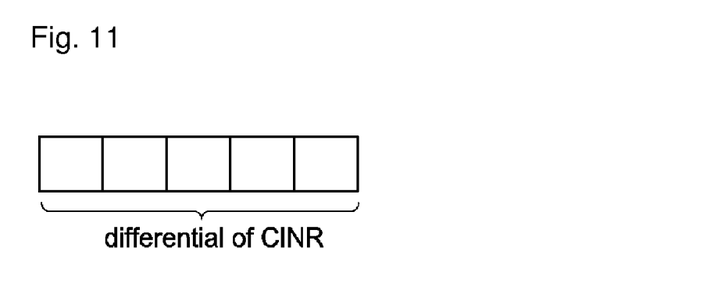
FIG. 11 shows a configuration of a payload for reporting a difference CINR according to another embodiment of the present invention.

FIG. 11 shows a configuration of a payload for reporting a difference CINR according to another embodiment of the present invention.

Referring to FIG. 11, the payload of the difference CINR denotes a differential of CINR for indicating an increment or decrement of a previously transmitted CINR. It is assumed herein that the differential of CINR consists of 5 bits. The number of bits may increase when the number of bands for transmitting information increases. Each bit of the differential of CINR corresponds to each best band, and indicates an increment or decrement of a CINR of each best band. Among a plurality of bit values that can be expressed by the differential of CINR, a specific bit value can be used as a maintain command for indicating that there is no need to update the CINR for each best band.

For example, a condition where a bit value of a difference CINR is '00000' may be specified as the maintain command. The condition may be duplicated with the payload of the difference CINR indicating that CINRs of all best bands decrease. Thus, the condition can be used as the maintain command when it is proved by experimentation that a decrement of the CINRs of all best bands does not frequently occurs. That is, a specific bit value of the payload of the difference CINR that seldom occurs experimentally can be used as the maintain command for indicating that there is no need to update the CINR for each best band previously reported.

Bit values and the number of bits of the maintain command may be arbitrarily determined. In addition, a condition where a specific value indicates the maintain command can also be applied to the configuration of the difference CINR including the validity indication. Even if the difference CINR includes only the differential of CINR, a specific bit may be transmitted in the form of NULL in order to indicate that the previously transmitted CINR is maintained without updating.

As such, since the CINR can be maintained without having to unconditionally use the differential of CINR periodically transmitted, a channel state can be adaptively reported when there is no change in a channel or when the channel change is significantly small. Therefore, it is possible to avoid transmission performance deterioration which may occur when the channel state is incorrectly reported.

Figure 12:
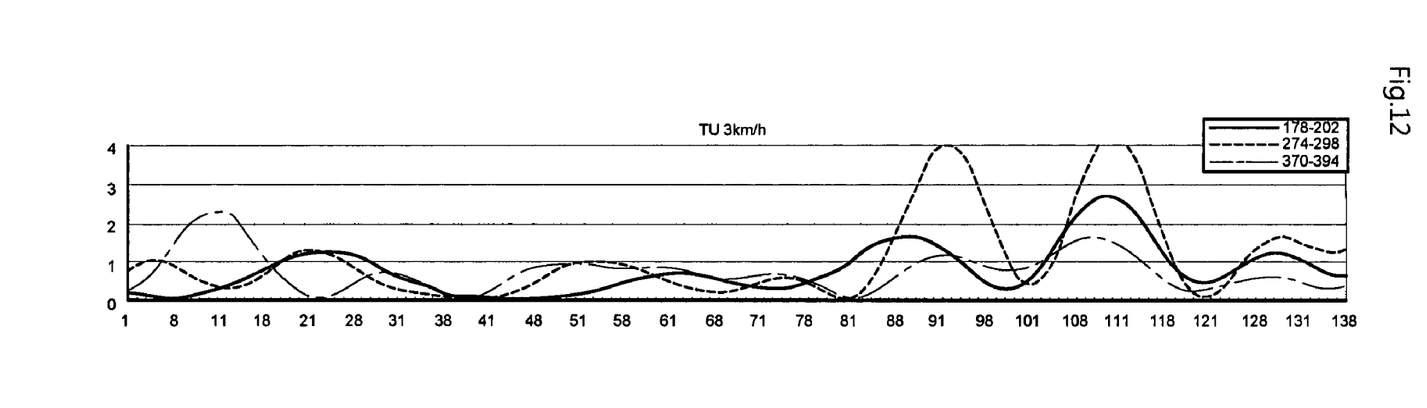
FIGS. 12 to 14 are graphs showing signal power for different frequency bands according to an embodiment of the present invention.
Figure 13:
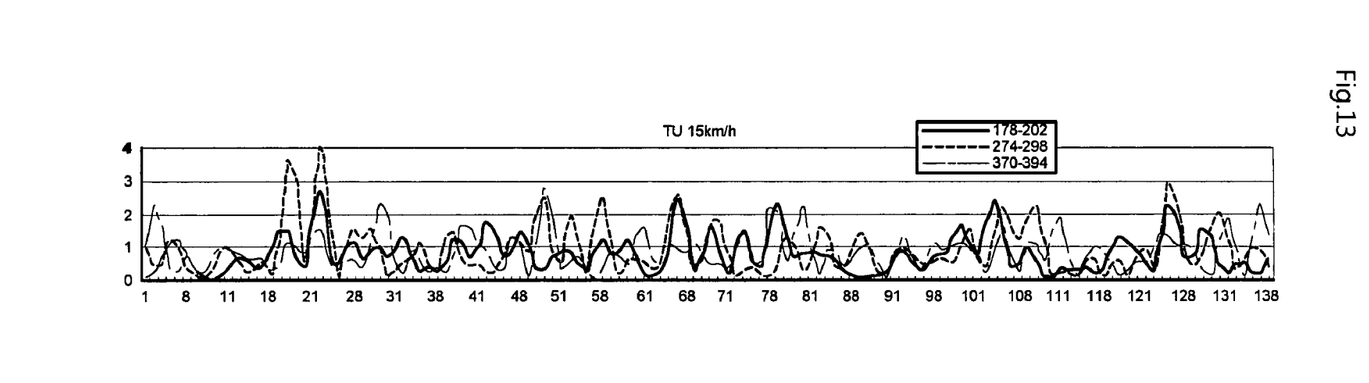
Figure 14:
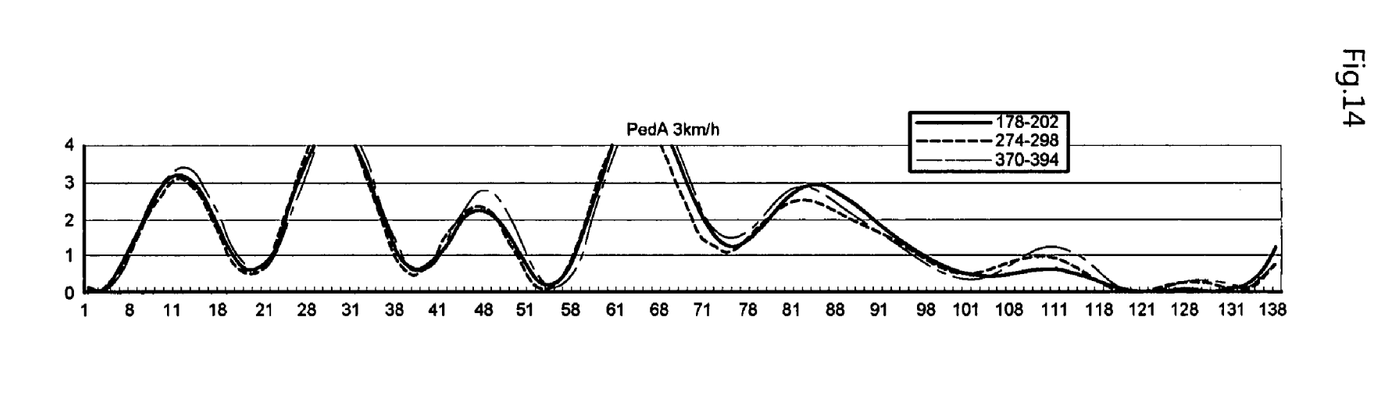

FIGS. 12 to 14 are graphs showing signal power for different frequency bands according to an embodiment of the present invention. A horizontal axis represents a frame (or time) unit. A vertical axis represents signal power. An index represents a subcarrier index (i.e., a frequency band).

FIGS. 12 and 13 show typical urban models. Specifically, FIG. 12 shows a case where data is transmitted in a transmission unit (TU) of 3 km/h, and FIG. 13 shows a case where data is transmitted in a TU of 15 km/h. FIG. 14 shows a pedestrian A model in a case where data is transmitted in a TU of 3 km/h.

These graphs show that signal power of different frequency bands increase and decrease with a similar pattern. The similar pattern can be seen in both cases of the pedestrian A model with a small frequency selectivity and the urban model with a large frequency selectivity. That is, CQIs vary with a similar pattern in different frequency bands. It can be decided that all bands have similar CQI variation patterns in the band AMC mode.

That is, in the band AMC mode, CQIs of respective bands collectively increase or decrease by a similar amount. The amount of increment or decrement is only slightly different in most of channel environments. In such a channel environment, it is ineffective to transmit a differential value indicating the amount of increment or decrement of a channel for each band under a limited radio resource.

When CQI variation information is collectively used for all bands, waste of resources can be reduced by separately reporting CQI up/down information for each band. In addition, since a CQI variation can be known specifically, modulation/coding scheduling can be more accurately implemented.

Further, in such a channel environment, if there is no change in a channel, or if the channel change is significantly small and thus there is no need to update a CQI, a UE may report CQI holding information to a BS.

In a situation where there is no change in a channel in such a channel environment, or where the channel change is significantly small and thus there is no need to update a CINR, the UE may report the situation to the BS by using a validity indication or a maintain command. When using a conventional method, there is a problem in that a channel state may not be able to be correctly reported. This is because the situation of no channel change or significantly small change cannot be taken into consideration when only an increment or decrement of a differential of CINR is periodically transmitted. According to the present invention, the problem of the conventional method can be improved and thus the channel state can be further accurately reported.

Every function as described above can be performed by a processor such as a microprocessor based on software coded to perform such function, a program code, etc., a controller, a micro-controller, an Application Specific Integrated Circuit (ASIC), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of reporting a channel state in a band adaptive modulation and coding (AMC) mode, the method comprising:
    transmitting a carrier to interference and noise ratio (CINR) at a first transmission period; and
    transmitting a differential of the CINR at a second transmission period by assigning a transmit power for indicating an increment or decrement of the CINR transmitted at the first transmission period and a validity indication for indicating a validity of the differential of the CINR,
    wherein the CINR transmitted at the first transmission period is maintained without alteration if the validity indication or the differential of the CINR is transmitted in the form of NULL without assigning a transmit power.

2. The method of claim 1, wherein the CINR is for a best band selected from a plurality of bands.

3. The method of claim 1, wherein: the validity indication comprises 1 bit.

4. A method of receiving a channel state in a band adaptive modulation and coding (AMC) mode, the method comprising:
    receiving a carrier to interference and noise ratio (CINR) at a first transmission period;
    receiving a differential of the CINR at a second transmission period with a transmit power being assigned for indicating an increment or decrement of the CINR received at the first transmission period and a validity indication for indicating a validity of the differential of the CINR; and
    updating the CINR received at the first transmission period based on the differential of the CINR and the validity indication,
    wherein the CINR received at the first transmission period is maintained without alteration if the validity indication or the differential of the CINR is received in the form of NULL without a transmit power being assigned.

5. The method of claim 4, wherein the CINR is for a best band selected from a plurality of bands.

6. The method of claim 4, wherein: the validity indication comprises 1 bit.

* * * * *